(12) United States Patent
Downing

(10) Patent No.: US 6,428,197 B1
(45) Date of Patent: Aug. 6, 2002

(54) SPOTLIGHT FOR AN ALL-TERRAIN VEHICLE

(75) Inventor: Richard G. Downing, Spirit Lake, IA (US)

(73) Assignee: Cycle Country Accessories Corporation, Milford, IA (US)

(*) Notice: Subject to any disclaimer, the term of this patent is extended or adjusted under 35 U.S.C. 154(b) by 0 days.

(21) Appl. No.: 09/716,519

(22) Filed: Nov. 20, 2000

(51) Int. Cl.$^7$ ............................................. F21V 21/14
(52) U.S. Cl. ..................... 362/523; 362/426; 362/427; 362/269; 362/275; 362/371
(58) Field of Search ................... 362/523, 530, 362/529, 426, 427, 269, 275, 528, 421, 371, 396, 190, 191

(56) References Cited

U.S. PATENT DOCUMENTS

| | | | |
|---|---|---|---|
| 1,816,233 A | * | 1/1931 | Russell .................. 362/287 |
| 4,075,470 A | * | 2/1978 | Moore .................. 362/287 |
| 5,360,282 A | * | 11/1994 | Nagengast et al. ......... 403/131 |

* cited by examiner

Primary Examiner—Stephen Husar
Assistant Examiner—Guiyoung Lee
(74) Attorney, Agent, or Firm—Thomte, Mazour & Niebergall; Dennis L. Thomte

(57) ABSTRACT

A spotlight is disclosed for use with an all-terrain vehicle or a snowmobile with the spotlight being selectively removably positioned in a U-shaped bracket which is pivotally secured to the vehicle about a vertical axis. The spotlight includes a housing having indentations at its opposite sides which removably receive inner ends of connectors which are positioned at the inner sides of the upper ends of the leg portions of the U-shaped bracket. The connectors are pivotally secured, about horizontal axes, to the leg portions. The leg portions of the U-shaped bracket are able to flex with respect to one another to permit the spotlight to be secured to the U-shaped bracket and to be removed therefrom.

13 Claims, 4 Drawing Sheets

SPOTLIGHT FOR AN ALL-TERRAIN VEHICLE

BACKGROUND OF THE INVENTION

1. Field of the Invention

This invention relates to a spotlight for an all-terrain vehicle and more particularly to a spotlight which is normally positioned in a spotlight support bracket secured to the all-terrain vehicle and which may be selectively removed therefrom.

2. Description of the Related Art

All-terrain vehicles normally include a wheeled frame means having a pair of drive wheels at the rearward end thereof and one or more steering wheels at the forward end thereof. The steerable wheels are turned by means of handlebars operatively secured thereto. An operator's seat is positioned on the wheeled frame means rearwardly of the handlebars. The all-terrain vehicle normally includes one or more headlights at the forward end thereof which direct light onto the area in front of the vehicle. The headlights of the vehicle are not able to illuminate areas to the side or rearwardly of the vehicle.

SUMMARY OF THE INVENTION

A spotlight is provided for use with an all-terrain vehicle and includes a U-shaped bracket including a base portion and first and second leg portions extending upwardly therefrom. The U-shaped bracket is operatively secured to the vehicle about a vertical axis. A first connector is pivotally secured to the upper end of the first leg portion about a horizontal axis. Similarly, a second connector is pivotally secured to the upper end of the second leg portion about a horizontal axis. The first and second connectors each have generally U-shaped inner end portions positioned at the inner sides of the first and second leg portions. A spotlight is selectively removably secured to the support bracket and includes a rearward end, a forward end, and first and second sides. A rearwardly protruding handle grip or handle is provided on the housing to enable the spotlight to be conveniently handheld or maneuvered. A generally U-shaped indentation or recess is formed in the first side of the housing and a generally U-shaped indication or recess is formed in the second side of the housing with the indentations of the housing adapted to receive the inwardly protruding U-shaped portions of the first and second connectors therein. When the spotlight is mounted in the support bracket, the spotlight may be pivotally moved, about a vertical axis, so that light from the spotlight may be directed to either side of the vehicle. Further, the forward end of the spotlight may be moved upwardly and downwardly, by means of the horizontal axes, as needed.

The U-shaped support bracket is comprised of a material such as steel or aluminum to enable the leg portions thereof to flex with respect to one another to enable the spotlight to be positioned in the bracket and so that the spotlight may be removed from the bracket.

It is therefore a principal object of the invention to provide a spotlight for an all-terrain vehicle.

A further object of the invention is to provide a spotlight for use on an all-terrain vehicle, snowmobile or boat.

Still another object of the invention is to provide a spotlight for a vehicle wherein the spotlight is selectively removably mounted in a support bracket.

Still another object of the invention is to provide a spotlight for an all-terrain vehicle or the like wherein the spotlight is normally mounted in a support bracket but which may be easily removed therefrom so that the spotlight may be hand-held.

Still another object of the invention is to provide a spotlight for an all-terrain vehicle or the like which is adjustable with respect thereto about a horizontal axis and about a vertical axis.

Yet another object of the invention is to provide a spotlight for an all-terrain vehicle or the like wherein the spotlight is positioned in a support bracket which includes means for selectively maintaining the spotlight in various positions with respect to the support bracket and the vehicle.

These and other objects will be apparent to those skilled in the art.

DESCRIPTION OF THE PREFERRED EMBODIMENT

Figure 1:
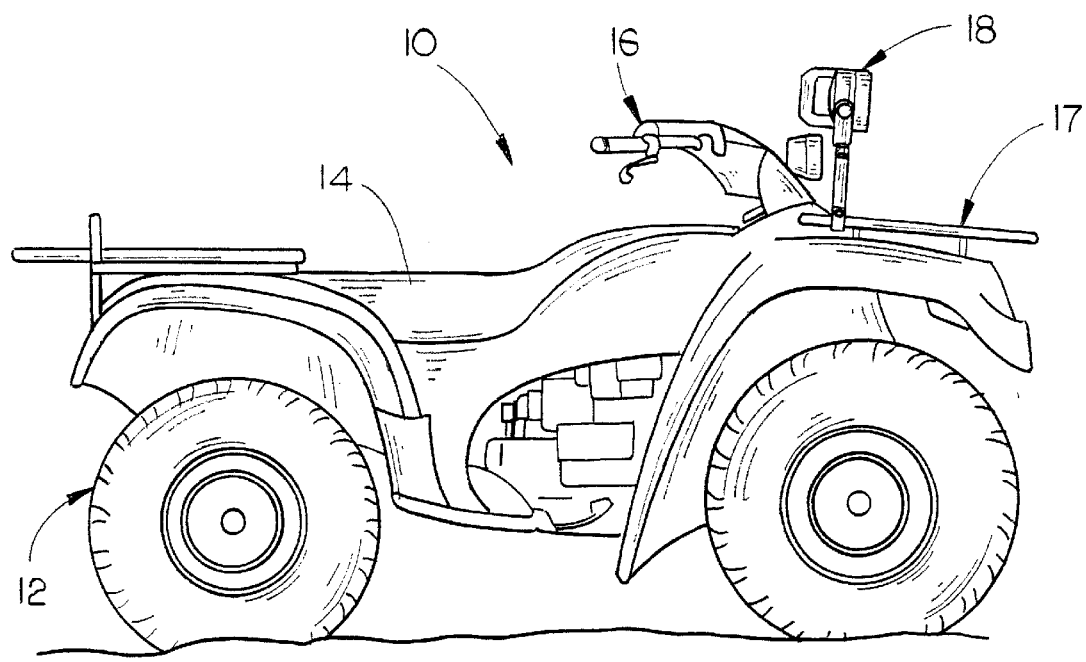
FIG. 1 is a side view of an all-terrain vehicle having the spotlight of this invention mounted on the front rack of the vehicle.
Figure 2:
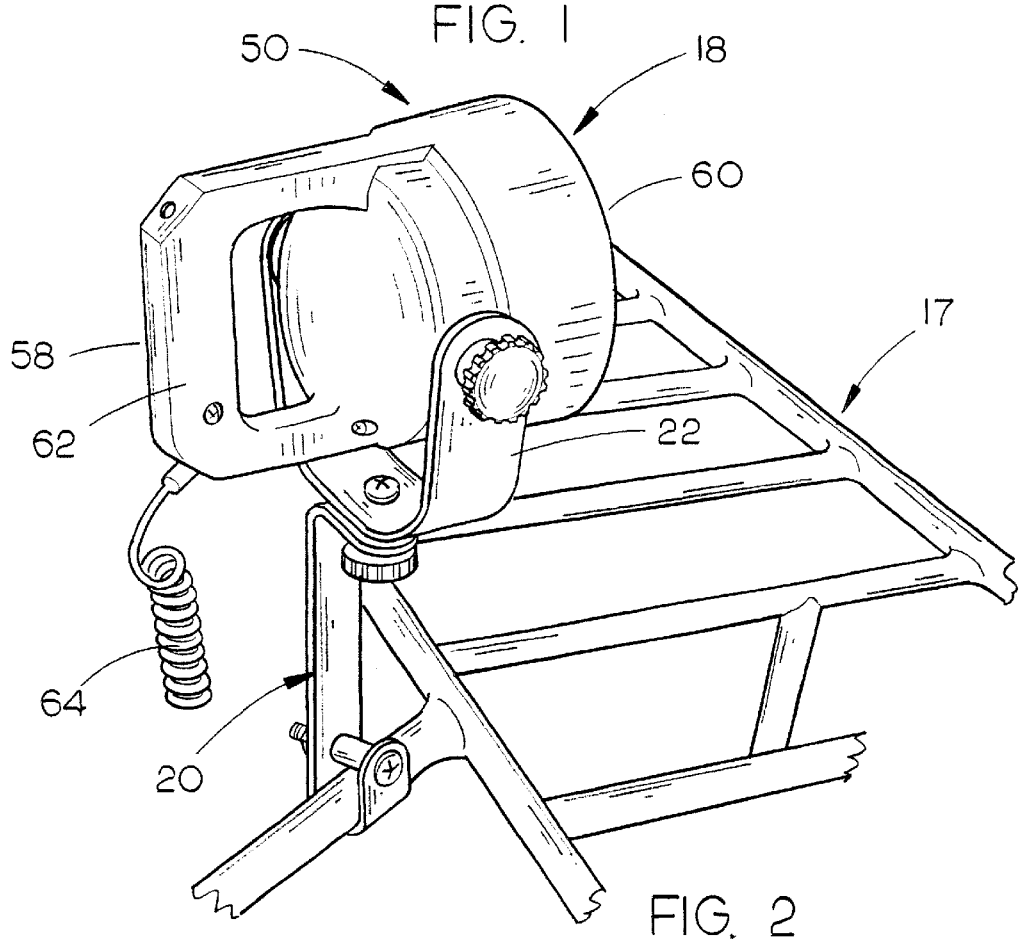
FIG. 2 is a perspective view of the spotlight mounted on the front rack.
Figure 3:
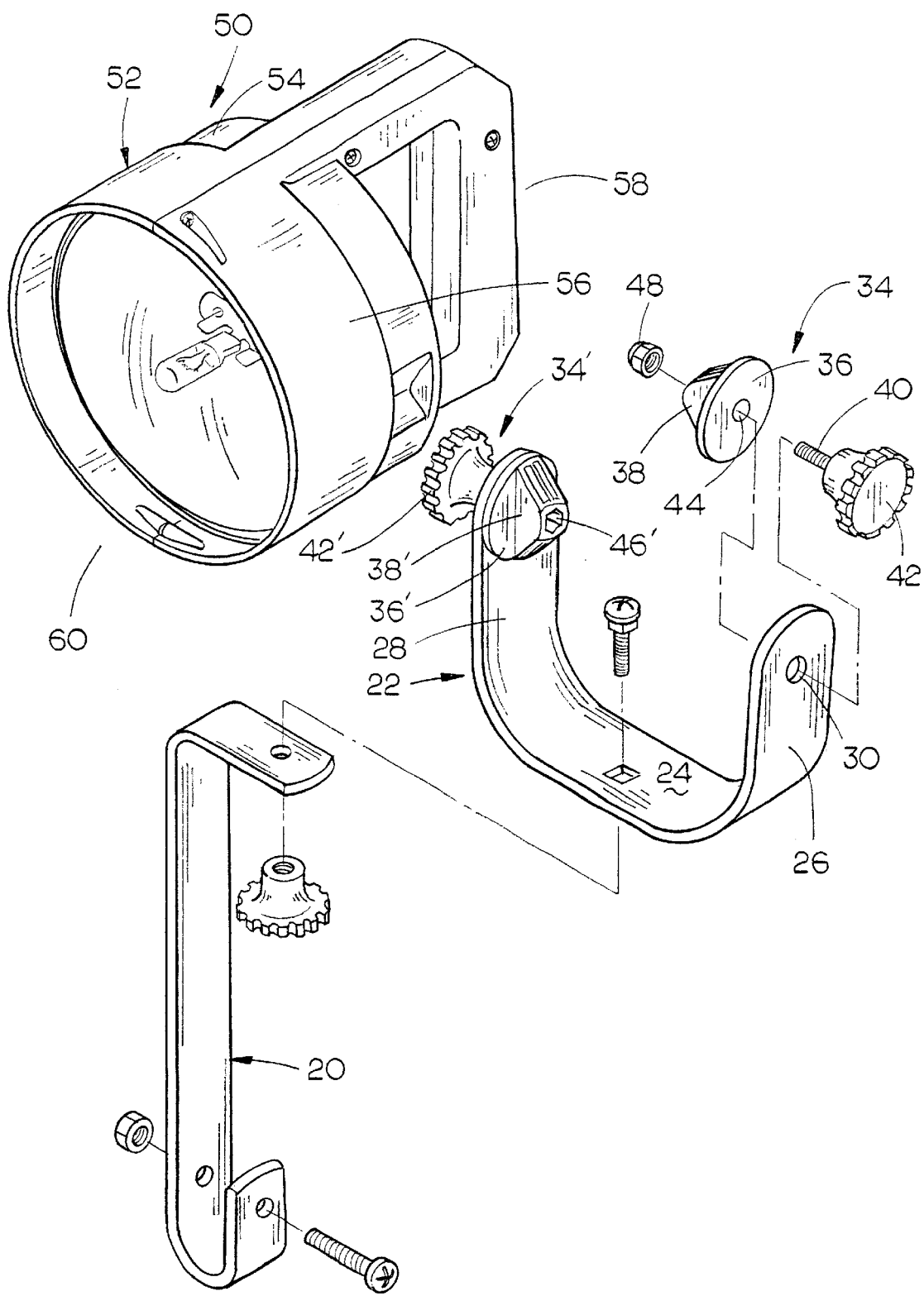
FIG. 3 is an exploded perspective view of the spotlight of this invention.

The numeral 10 refers generally to an all-terrain vehicle (ATV) generally including a wheeled frame means 12 having an operator's seat 14 provided thereon. The numeral 16 refers to handlebars which are operatively connected to the front wheel or wheels of the ATV to permit the steering of the vehicle. Vehicle 10 includes a front rack 17 positioned forwardly of the handlebars 16.

Although the spotlight assembly of this invention is ideally suited for use on an all-terrain vehicle, the spotlight could be used in other combinations such as a snowmobile, boat, etc. The numeral 18 refers generally to the spotlight assembly of this invention. Assembly 18 includes a first support 20 which is secured to the front rack 17 by any convenient means such as by clamping or the like and which extends upwardly from the rack 17, as seen in the drawings. Support 20 could be secured to other portions of the vehicle 10 as well. Further, if required, support 20 could include a swivel connection or joint to permit it to be swiveled with respect to the vehicle.

The numeral 22 refers to a U-shaped spotlight support which includes a base portion 24, a first leg portion 26 and a second leg portion 28. Spotlight support 22 is constructed of a material such as aluminum or steel which permits the leg portions 26 and 28 to flex with respect to one another to permit the leg portions to move outwardly with respect to one another as will be described in more detail hereinafter. The upper ends of leg portions 26 and 28 are each provided with an opening 30 formed therein. The numerals 34 and 34' refer to first and second connectors which are selectively pivotally mounted on the upper ends of the first and second leg portions 26 and 28, respectively. Inasmuch as connector 34' is identical to connector 34, only connector 34 will be described in detail with "'" indicating identical structure on connector 34'.

Connector 34 includes a disc-shaped portion 36 having a U-shaped inner end portion 38 extending inwardly therefrom. Threaded stud 40 extends inwardly from tightening knob 42 through the opening 30 in leg portion 26. Stud 40 extends through opening 44 formed in disc-shaped portion 36 and inner end portion 38. The outer end of the knob 42 has a recess 46 formed therein adapted to receive the nut 48 which threadably receives the stud 40 therein. Tightening of the knob 42 with respect to the connector 34 maintains the connector 34 in various pivotal positions with respect to leg portion 26. The inner end of inner end portion 38 is provided with an opening formed therein which receives a nut 48 therein. The stud 40 is threadably received by the nut 48 so that tightening of the knob 42 with respect to disc-shaped portion 36 and inner end portion 38 maintains the connector in various pivotal positions with respect to leg portion 26. The inner end of inner end portion 38' is provided with an opening 46' formed therein (identical to the opening in the inner end of inner end portion 38) which receives a nut which is identical to nut 48.

Spotlight assembly 18 includes a spotlight 50 including a housing 52 having opposite sides 54 and 56, a rearward end 58, and a forward end 60. A handle or hand grip 62 is provided at the rearward end of the housing 52 to enable the spotlight to be hand-held and to enable the spotlight to be moved to its various positions as will be described hereinafter. Spotlight 50 is connected to the electrical system of the vehicle by means of the cord 64. A switch is preferably provided in the handle 62 for controlling the operation of the spotlight 50, as desired. Side 54 of housing 52 is provided with a U-shaped indentation or recess 66 formed therein which is adapted to removably receive U-shaped portion 38 of connector 34 therein. Side 56 of housing 52 is provided with a U-shaped indentation or recess 68 formed therein which is adapted to removably receive U-shaped portion 38' of connector 34' therein.

In use, the first support 20 is mounted on the rack 17 of the all-terrain vehicle, as seen in the drawings. Preferably, the support 20 would be secured to the front rack closely adjacent one of the grip portions of the handlebars 16. The U-shaped support 22 is pivotally secured to support 20, about a vertical axis, by means of the connector 70. The spotlight 50 is mounted in the U-shaped support 22 by maneuvering the housing 52 so that the indentation 66 partially receives the U-shaped portion 38 of connector 34. The housing 52 is then pivoted or rotated downwardly to bring the indentation 68 into alignment with the U-shaped portion 38' of connector 34'. As the housing 52 is pivoted or rotated as described, the leg portions 26 and 28 separate or move outwardly with respect to one another to enable the spotlight to be positioned between the leg portions 26 and 28 with the indentations 66 and 68 receiving the U-shaped portions 38 and 38' of the connectors 34 and 34', respectively.

Figure 4:
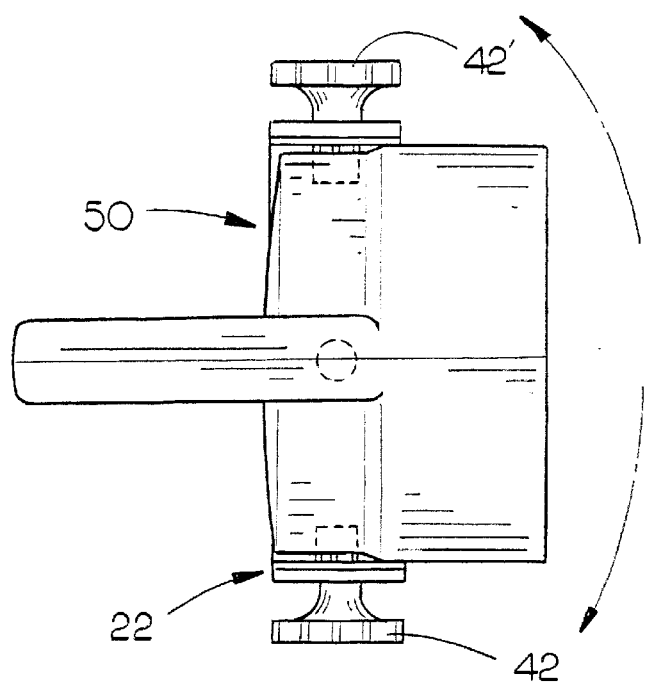
FIG. 4 is top elevational view of the spotlight with the arrows indicating the movement of the spotlight about a vertical axis.
Figure 5:
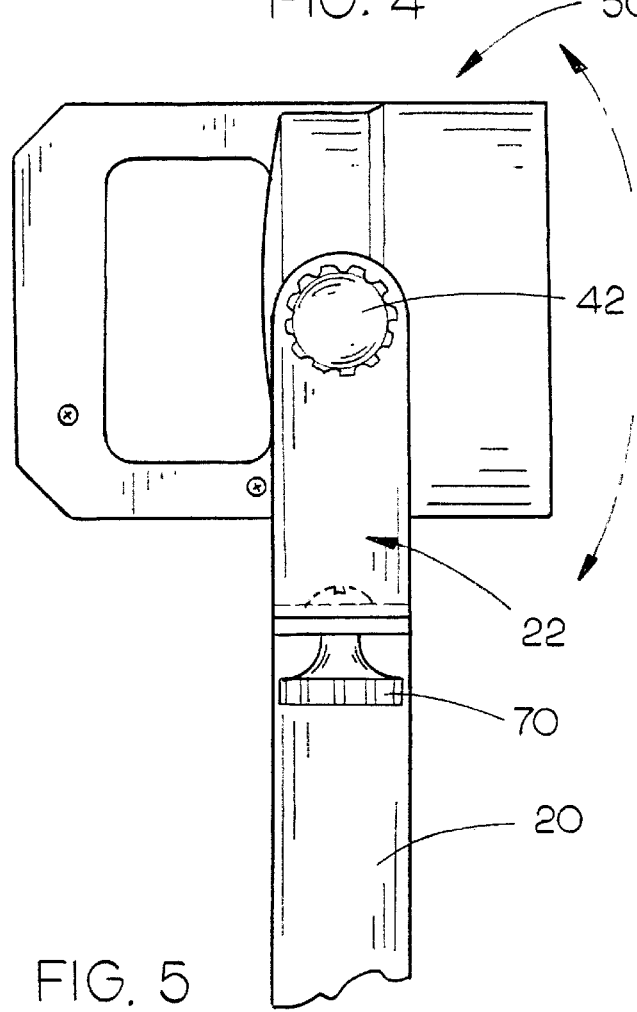
FIG. 5 is a partial side elevational view of the spotlight with the arrows indicating the pivotal movement of the spotlight about a horizontal axis.
Figure 6:
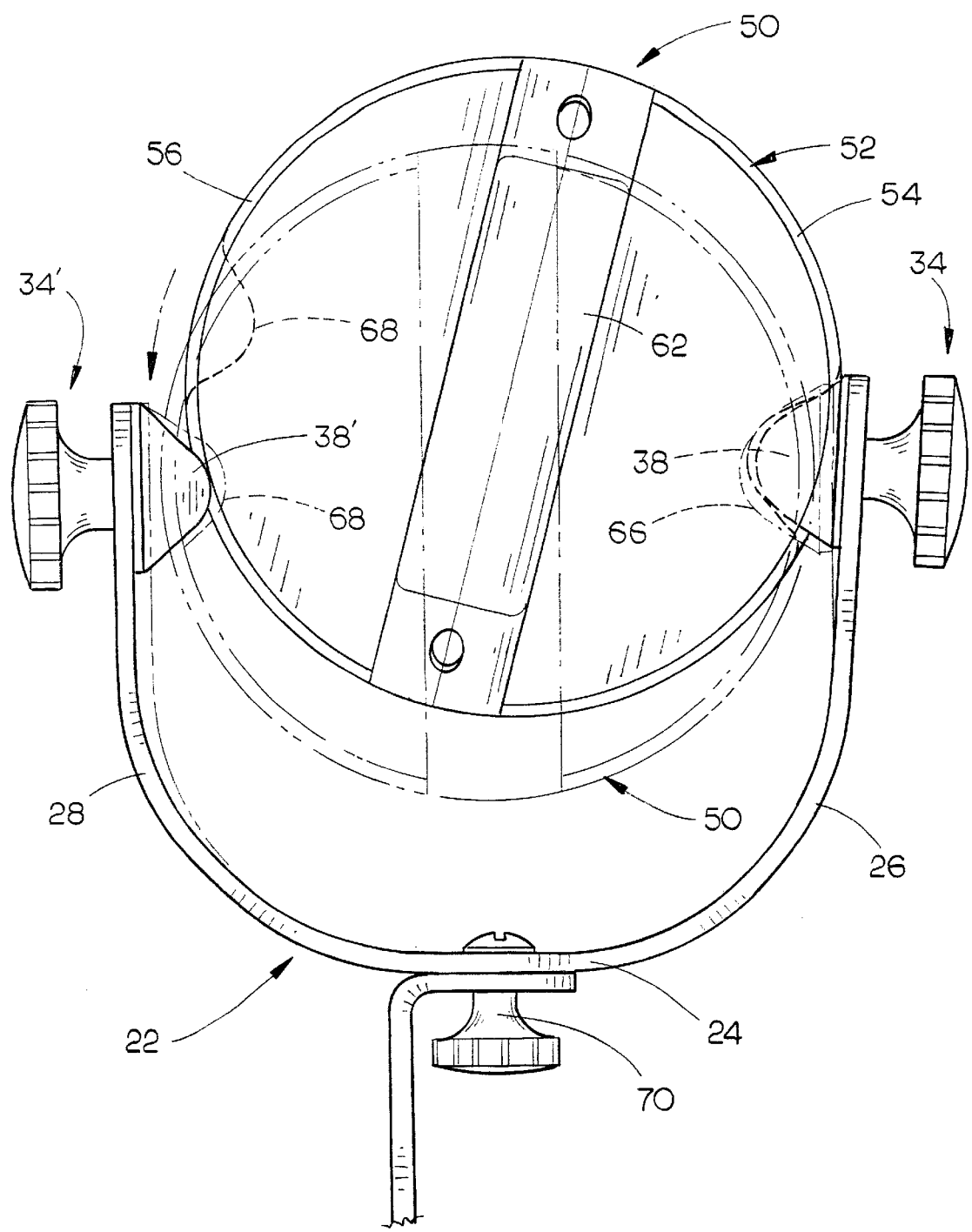
FIG. 6 is a rear view of the spotlight which illustrates the manner in which the spotlight is inserted into the U-shaped bracket.

When the spotlight 50 is mounted in the support 22, the spotlight 50 may be pivoted upwardly and downwardly about the threaded studs with the knobs 42 and 42' yieldably maintaining the spotlight in its desired position, as seen in FIG. 5. The spotlight may also be moved from side to side about the first support 20, as seen in FIG. 4.

If the operator desires to remove the spotlight 50 from the support 22, the operator grips the handle 62 and rotates the spotlight 50 with respect to the support 22 to cause the disengagement of one of the U-shaped portions 38 or 38' from the indentations 66 and 68 of the housing 52. The removal of the spotlight 50 from the support 22 is made possible by the flexibility of the leg portions 26 and 28 which flex outwardly with respect to one another as the spotlight 50 is removed from the support 22.

Thus it can be seen that the invention accomplishes at least all of its stated objectives.

I claim:

1. In combination with an all-terrain vehicle, comprising:
   a spotlight support bracket having a base portion with spaced-apart first and second leg portions extending upwardly therefrom;
   each of said first and second leg portions having upper ends and inner and outer sides;
   means for securing said support bracket to the vehicle;
   a first connector positioned at said inner side of said first leg portion which protrudes inwardly therefrom;
   said first connector being selectively pivotally secured to said first leg portion about a horizontal axis;
   a second connector positioned at said inner side of said second leg portion which protrudes inwardly therefrom;
   said second connector being selectively pivotally secured to said second leg portion about a horizontal axis;
   and a spotlight selectively removably secured to said spotlight support bracket;
   said spotlight including a housing having a forward end, a rearward end, and first and second sides;
   said first side of said housing having a first indentation formed therein which removably receives said first connector therein when said spotlight is secured to said bracket;
   said second side of said housing having a second indentation formed therein which removably receives said second connector therein when said spotlight is secured to said bracket.

2. The combination of claim 1 wherein said support bracket is generally U-shaped.

3. The combination of claim 1 wherein said bracket is comprised of a material which permits said leg portions to flex with respect to one another to enable said spotlight to be positioned between said leg portions with said connectors being received by said indentations and to enable said spotlight to be removed therefrom.

4. The combination of claim 1 further including means for selectively maintaining said connectors in various pivotal positions with respect to said bracket.

5. The combination of claim 1 wherein each of said indentations are generally U-shaped and wherein said connectors have generally U-shaped inner end portions which are received by said U-shaped indentations.

6. The combination of claim 1 wherein the vehicle has a rack at its forward end and wherein said bracket is operatively secured to the rack.

7. The combination of claim 6 wherein said means for securing said support bracket to the vehicle comprises an upstanding support and wherein said bracket is pivotally secured to said support about a vertical axis.

8. A spotlight assembly, comprising:
   a spotlight support bracket having a base portion with spaced-apart first and second leg portions extending upwardly therefrom;
   each of said first and second leg portions having upper ends and inner and outer sides;

a first connector positioned at said inner side of said first leg portion which protrudes inwardly therefrom;

said first connector being selectively pivotally secured to said first leg portion about a horizontal axis;

a second connector positioned at said inner side of said second leg portion which protrudes inwardly therefrom;

said second connector being selectively pivotally secured to said second leg portion about a horizontal axis;

and a spotlight selectively removably secured to said spotlight support bracket;

said spotlight including a housing having a forward end, a rearward end, and first and second sides;

said first side of said housing having a first indentation formed therein which removably receives said first connector therein when said spotlight is secured to said bracket;

said second side of said housing having a second indentation formed therein which removably receives said second connector therein when said spotlight is secured to said bracket.

9. The assembly of claim 8 wherein said support bracket is generally U-shaped.

10. The assembly of claim 8 wherein said bracket is comprised of a material which permits said leg portions to flex with respect to one another to enable said spotlight to be positioned between said leg portions with said connectors being received by said indentations and to enable said spotlight to be removed therefrom.

11. The assembly of claim 8 further including means for selectively maintaining said connectors in various pivotal positions with respect to said bracket.

12. The assembly of claim 8 wherein each of said indentations are generally U-shaped and wherein said connectors have generally U-shaped inner end portions which are received by said U-shaped indentations.

13. The assembly of claim 8 further comprising an upstanding support and wherein said support bracket is pivotally secured to said upstanding support about a vertical axis.

* * * * *